United States Patent [19]
Ho

[11] Patent Number: 6,062,053
[45] Date of Patent: May 16, 2000

[54] QUICK-RELEASE LOCKING DEVICE FOR LOCKING AN ARTICLE BASKET/BAG ON A BICYCLE HANDLE BAR

[76] Inventor: Kuo-Ping Ho, Fl. 11, No. 294, Sec. 2, Tung-Hwa St., Taipei, Taiwan

[21] Appl. No.: 09/226,201

[22] Filed: Jan. 7, 1999

[51] Int. Cl.⁷ .................................................. B62H 5/00
[52] U.S. Cl. .................. 70/233; 70/360; 70/62; 224/448; 224/434; 224/420; 224/417; 248/553; 248/222.11; 292/DIG. 37; 292/DIG. 38
[58] Field of Search ............................. 248/553, 222.11, 248/220.22; 224/420, 433–435, 448, 449; 70/233, DIG. 20, DIG. 27, 345, 360, 62, 64; 292/DIG. 37, DIG. 38

[56] References Cited

U.S. PATENT DOCUMENTS

| | | |
|---|---|---|
| 2,646,241 | 7/1953 | McLean . |
| 3,604,230 | 9/1971 | Tixier ............................... 292/DIG. 38 |
| 3,823,856 | 7/1974 | Uchida ........................................ 70/58 |
| 4,260,084 | 4/1981 | Warren, Jr. . |
| 4,435,966 | 3/1984 | Craig ........................................ 70/360 |
| 5,024,359 | 6/1991 | Thomas . |
| 5,171,155 | 12/1992 | Mendoza .................................. 70/360 |
| 5,181,774 | 1/1993 | Lane . |
| 5,282,554 | 2/1994 | Thomas . |
| 5,332,183 | 7/1994 | Kagayama ......................... 248/222.11 |
| 5,406,816 | 4/1995 | Thomas . |
| 5,653,366 | 8/1997 | Liserre ..................................... 224/436 |
| 5,735,441 | 4/1998 | Fujimoto ................................. 224/420 |

FOREIGN PATENT DOCUMENTS 4338410  5/1995  Germany .

*Primary Examiner*—Darnell M. Boucher
*Attorney, Agent, or Firm*—Varndell & Varndell, PLLC

[57] ABSTRACT

A quick-release locking device for locking an article basket on a bicycle handle bar, including a fastener body and a main body. The fastener body is a double-layer plate body formed with insertion slots and a fixing slot for engaging with the main body. One end of the main body is disposed with latch arms for engaging with the fastener body and a resilient engaging section for engaging with a slope engaging block of a push button. Lower edges of two sides of the other end of the main body are respectively disposed with clamping passages in which the bicycle handle bar is clamped and fixed. The locking device serves to lock the article basket on the bicycle with a quick-release function, whereby the basket or bag can be directly taken out from the bicycle for shopping or preventing the article placed in the article basket from being stolen.

7 Claims, 6 Drawing Sheets

6,062,053

QUICK-RELEASE LOCKING DEVICE FOR LOCKING AN ARTICLE BASKET/BAG ON A BICYCLE HANDLE BAR

BACKGROUND OF THE INVENTION

The present invention relates to a quick-release locking device for firmly locking an article basket or bag on front side of a bicycle handle bar.

With respect to those bicycles not equipped with any article bag or article basket on handle bar, in the case that a user rides the bicycle out for shopping, the purchased articles can be hardly loaded on and carried by the bicycle.

On the other hand, with respect to those bicycles equipped with article bag or article basket on the handle bar, such article bag or article basket are often fixed on the bicycle and cannot be easily disassembled therefrom. Therefore, a user cannot carry the article basket or bag with him/her. Therefore, the articles placed in the article bag or basket are likely to be stolen by a thief.

SUMMARY OF THE INVENTION

It is a primary object of the present invention to provide a quick-release locking device for detachably locking an article basket or bag on the bicycle handle bar. A user can quickly and easily take down the basket or bag from the bicycle and carry the basket or bag for shopping or preventing the articles placed in the basket or bag from being stolen.

It is a further object of the present invention to provide the above quick-release locking device which enables a user to freely selectively add an article basket or bag to the bicycle as necessary.

According to the above objects, the quick-release locking device of the present invention includes a fastener body and a main body. The fastener body is a double-layer plate body formed with insertion slots and a fixing slot for engaging with the main body. One end of the main body is disposed with latch arms for engaging with the fastener body and a resilient engaging section for engaging with a slope engaging block of a push button. Lower edges of two sides of the other end of the main body are respectively disposed with clamping passages in which the bicycle handle bar is clamped and fixed. The locking device serves to lock the article basket on the bicycle with a quick-release function, whereby the basket or bag can be directly taken out from the bicycle for shopping or preventing the article placed in the article basket from being stolen.

The present invention can be best understood through the following description and accompanying drawings, wherein:

DETAILED DESCRIPTION OF THE PREFERRED EMBODIMENT

Figure 1:
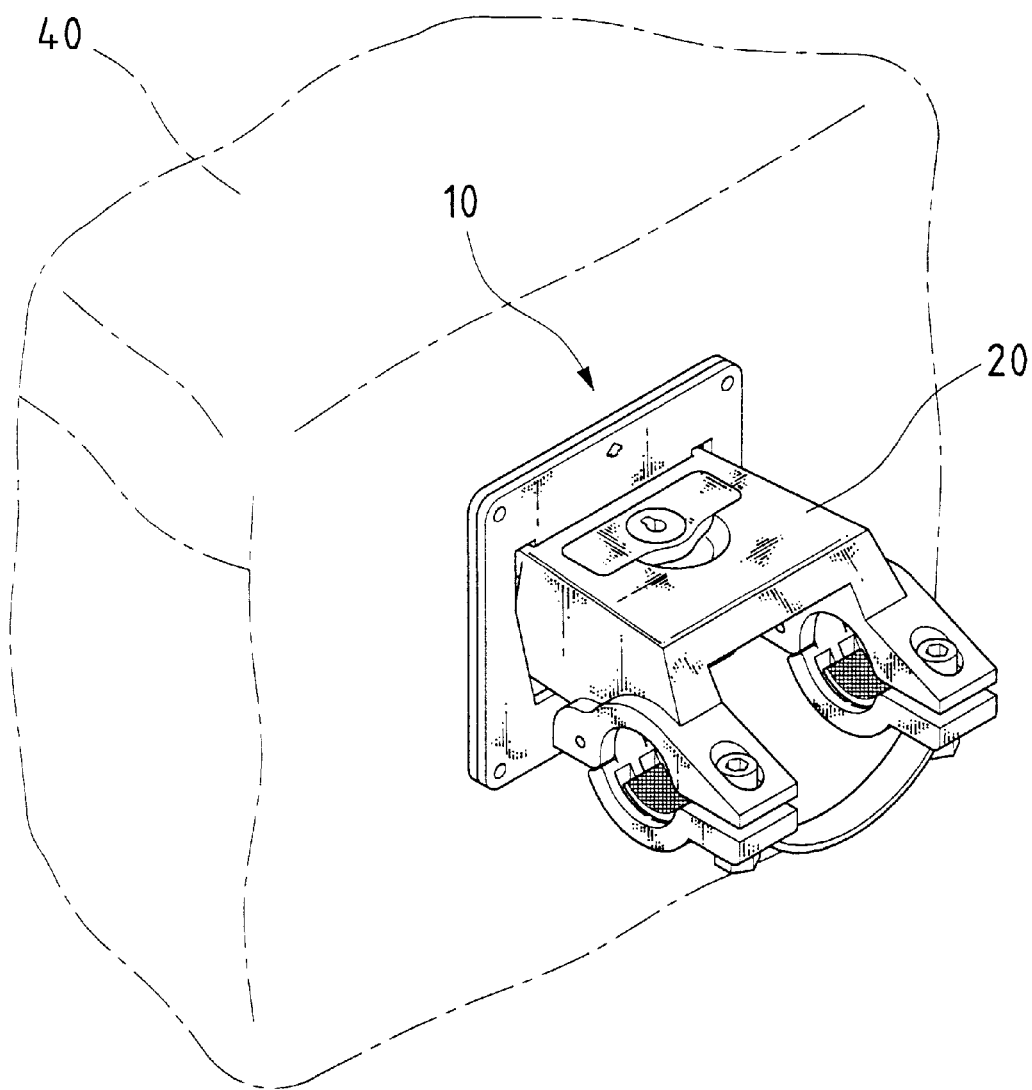
FIG. 1 is a perspective view of the present invention.

Please refer to FIG. 1. The present invention is composed of a fastener body 10 and a main body 20.

Figure 2:
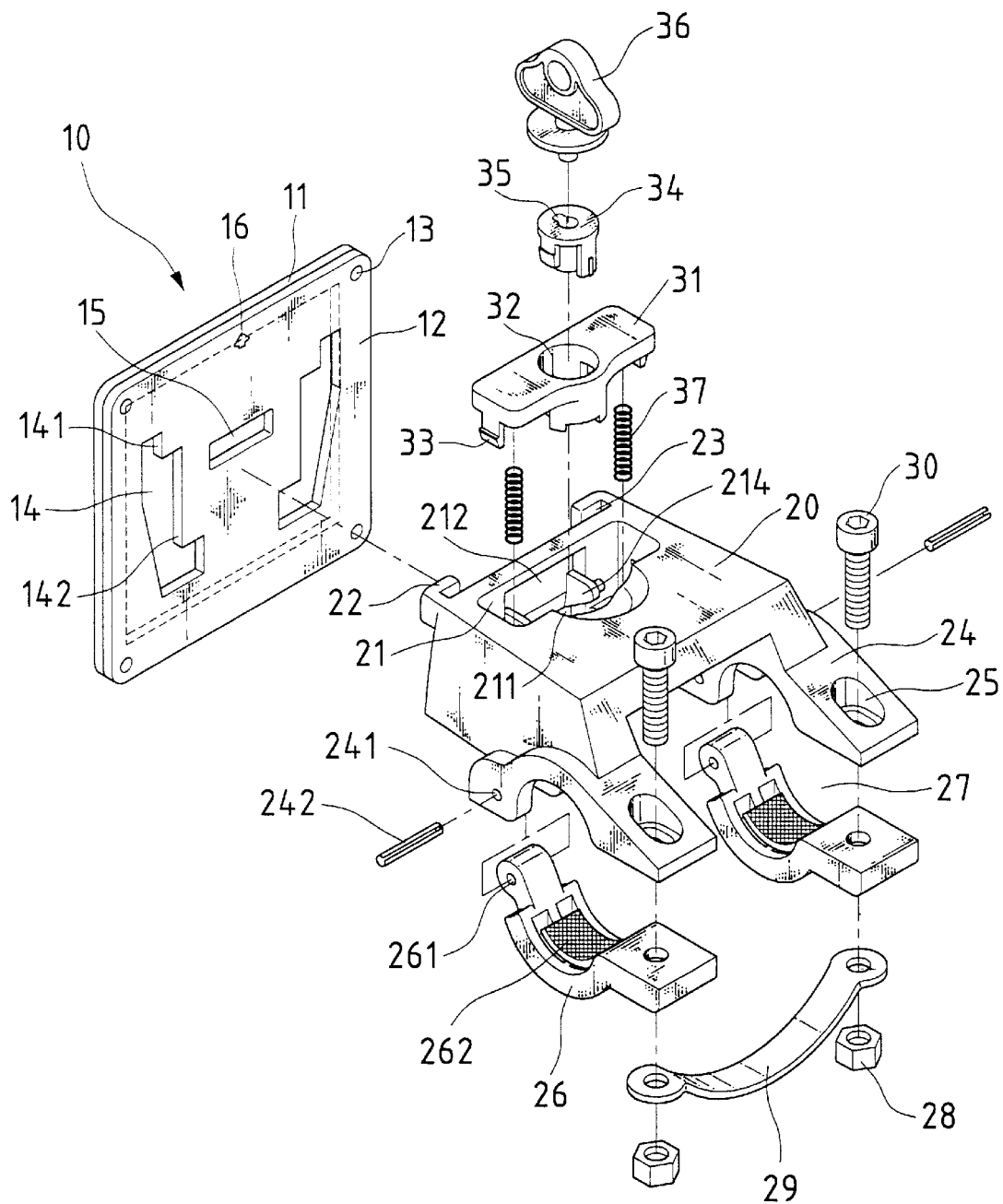
FIG. 2 is a perspective exploded view of the present invention.
Figure 5:
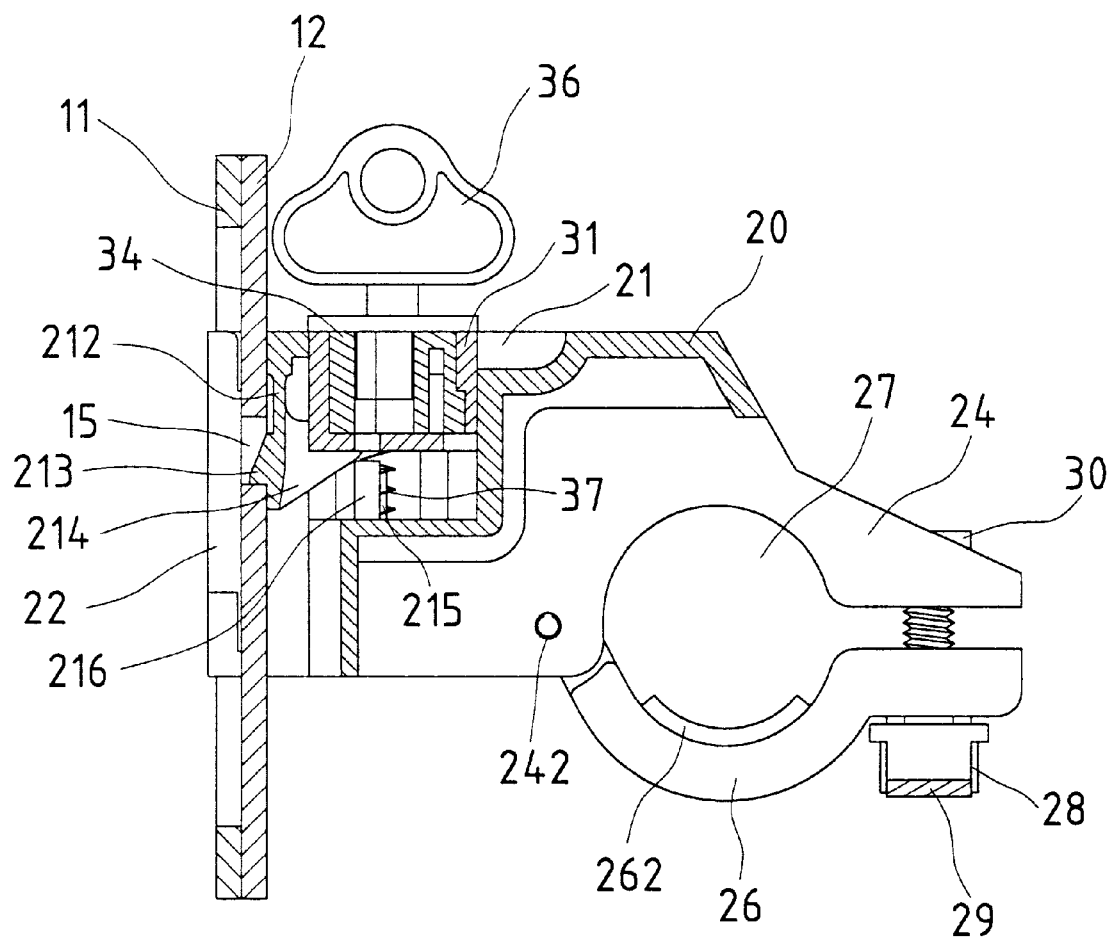
FIG. 5 is a sectional assembled view of the present invention.

Referring to FIGS. 2 and 5, the fastener body 10 includes a rectangular frame body 11 and a plate body 12 having the same shape as that of the frame body 11. The frame body 11 is attached to the plate body 12. Each corner of the frame body and the plate body is formed with a thread hole 13. Two sides of the plate body 12 are formed with symmetrical irregular insertion slots 14. An upper and a lower edges of each insertion slot 14 are formed with a first and a second angles 141, 142 of 90 degrees. A fixing slot 15 is formed at a center of the plate body 12 between the two insertion slots 14. A mark 16 is disposed on an upper edge of the fixing slot 15.

Figure 6:
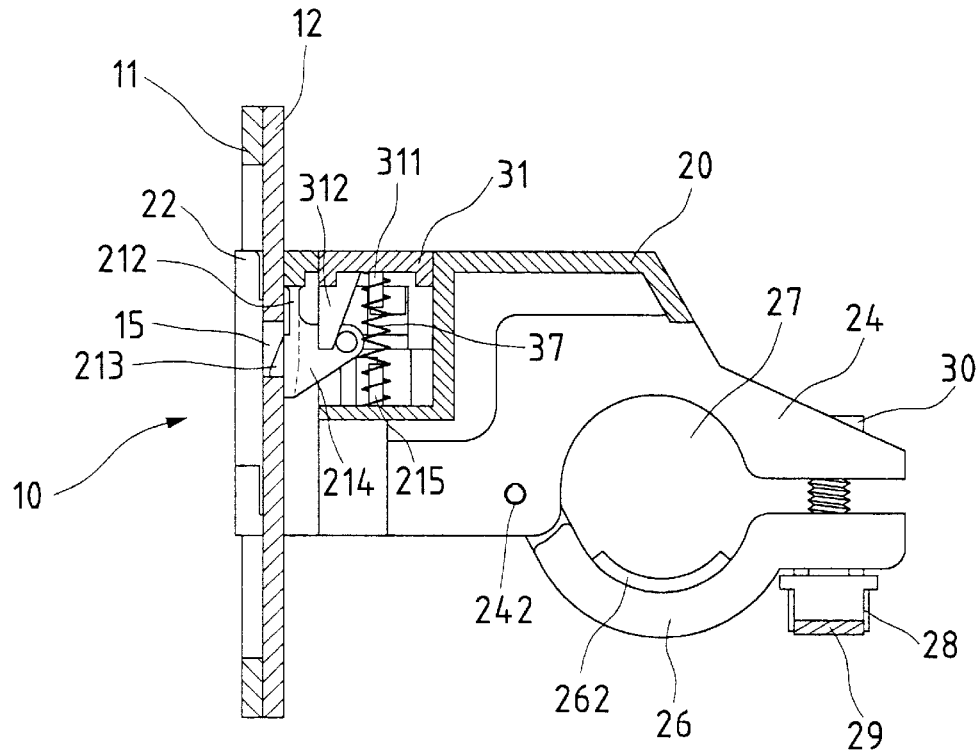
FIG. 6 is a sectional view showing that the fastener body is locked with the main body.

The main body 20 is an irregular body made by integral injection molding. A front end of the main body 20 is disposed with two latch arms 22 each defining a recess 23 on inner side corresponding to the insertion slot 14 of the plate body 12. The wall between the latch arms 22 is formed with a U-shaped sink 211 surrounding a resilient plate 212 downward extending from a top thereof. A front side of the resilient plate 212 is formed with a slope engaging section 213. Two ends of rear side thereof are respectively disposed with two abutting plates 214 each having a projection. Two sides of the bottom and the center of a push button hole 21 are disposed with posts 215, 216. A spring 37 is fitted on each lateral post 215 and then a push button 31 is inserted with the posts 215. Two sides of the bottom of the push button 31 are disposed with resilient slope latch sections 33. The center of the push button is formed with a lock core hole 32 in which a lock core 34 with a lock hole 35 is movably inserted. Referring to FIG. 6, the bottom of the push button 31 is disposed with a post 311 and a slope engaging block 312. Two sides of a rear end of the main body 20 are disposed with upper arch plates 24 defining a U-shaped opening of the rear end of the main body 20. A rear end of each upper arch plate 24 is formed with a bolt hole 25. The bottom of front end of the upper arch plate is formed with a transverse pin hole 241 for an insertion pin 242 to fit thereinto so as to connect with a lower arch plate 26 formed with a pin hole 261 at rear end. A slipproof block 262 is disposed on a concave of the lower arch plate 26, whereby the upper and lower arch plates 24, 26 define therebetween a clamping passage 27. A bolt 30 is passed through the thread holes 25 of the upper and lower arch plates 24, 26 and tightened by a nut 28 and a bridge plate 29 so as to lock two sides of the upper and lower arch plates 24, 26 to form the clamping passage 27.

Figure 3:
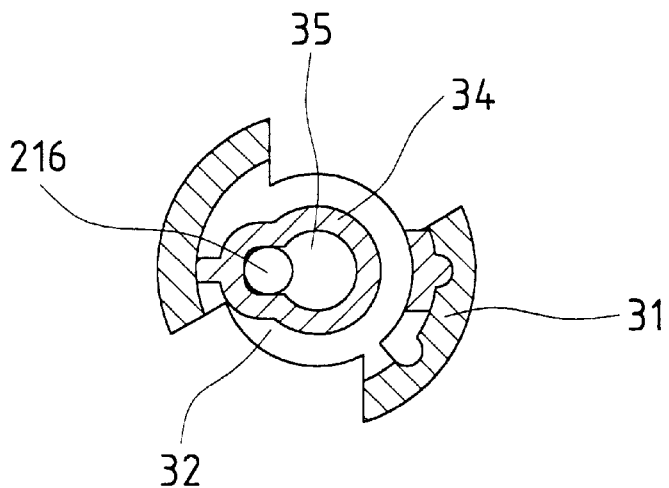
FIG. 3 is a top view of the lock core of the present invention, showing an unlocked state thereof.
Figure 7:
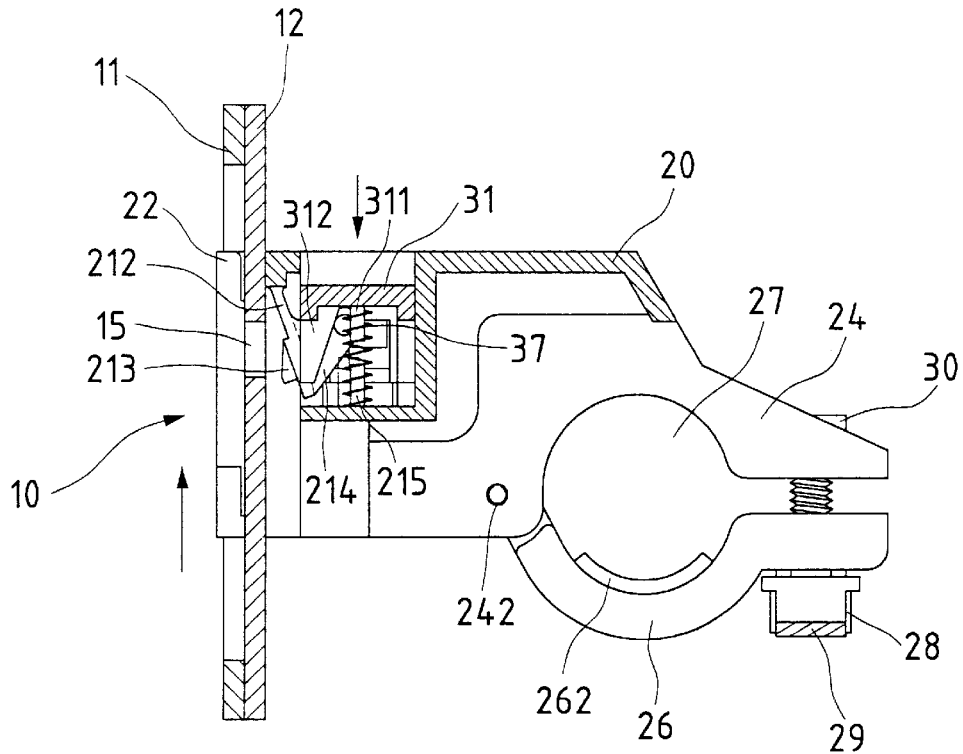
FIG. 7 is a sectional view showing that the fastener body is unlocked from the main body.

Referring to FIGS. 6 and 7, when the latch arms 22 of the front end of the main body 20 are fitted into the insertion slots 14 of the fastener body 10, the main body 20 is pushed upward in a direction of the mark arrow 16 of the fastener body 10. At this time, the slope engaging section 213 of front side of the resilient plate 212 between the latch arms 22 is engaged in the fixing slot 15 of the fastener body 10 so as to associate the main body 20 with the fastener body 10. At this time, as shown in FIG. 3, the lock hole 35 of the lock core 34 in the push button 31 is right aligned with the post 216 of the center of the bottom of the push button hole 21 of the main body 20. When it is desired to separate the fastener body 10 from the main body 20, a user only needs to directly press down the push button 31, whereby the projections of the abutting plates 214 of the rear side of the resilient plate 212 is forced and shifted backward by the slope engaging block 312 of the bottom of the push button 31 (as shown in FIG. 7). At this time, the slope engaging section 213 of front side of the resilient plate 212 is disengaged from the fixing slot 15 of the fastener body 10 so as to detach the fastener body 10 from the main body 20.

Figure 4:
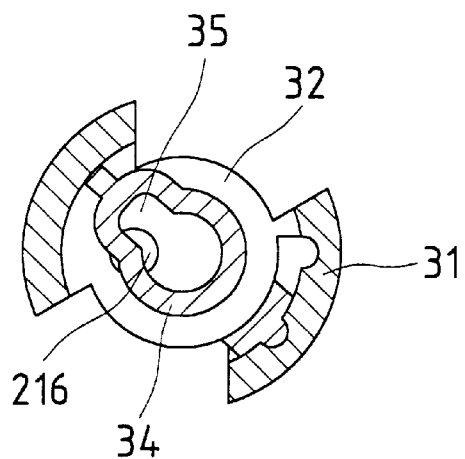
FIG. 4 is a top view according to FIG. 3, showing a locking state thereof.

Reversely, when it is desired to lock the fastener body 10 with the main body 20 without detachment, as shown in FIG. 4, under the condition that the fastener body 10 is engaged with the main body 20, a key 36 is used to rotate the lock core 34 to disalign the lock hole 35 from the post 216 of the center of the bottom of the push button hole 21 of the main body 20. Accordingly, when pressed down, the peripheral wall of the lock hole 35 will be stopped by the post 216, preventing the push button 31 from being pressed down. Therefore, the main body 20 cannot be disengaged from the fastener body 10.

Figure 8:
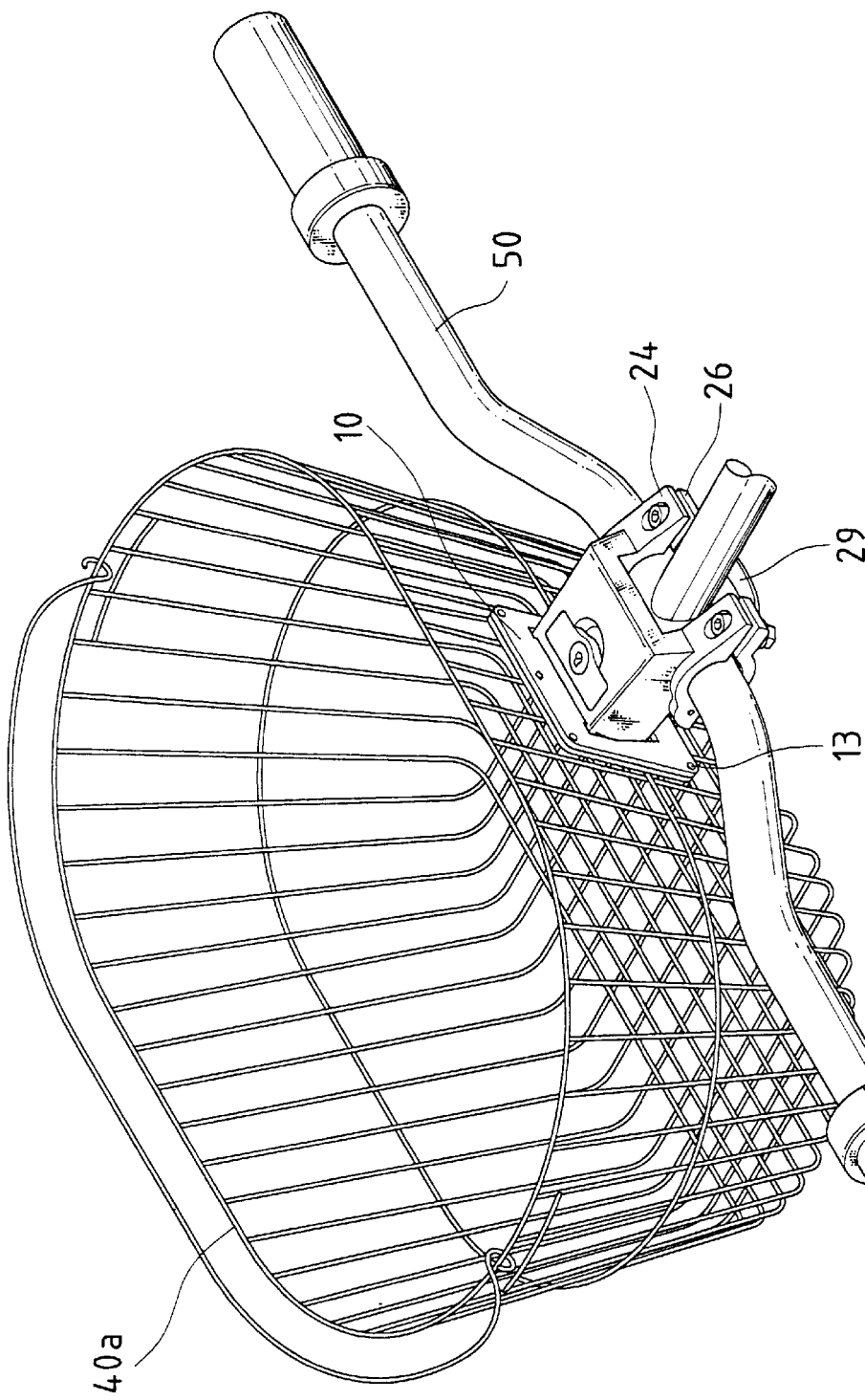
FIG. 8 shows the application of the present invention.

FIG. 8 shows the application of the present invention. The fastener body 10 is locked on a basket 40*a* by means of the thread holes 13 (or locked on an article bag 40 as shown in FIG. 1). The U-shaped opening of the main body 20 is positioned at a central adjoining beam of the handle bar 50 of a bicycle. The lower arch plates 26 are passed through the handle bar 50 and then the upper and lower arch plates 24, 26 are locked together to clamp the handle bar 50 in the clamping passage 27. The slipproof block 262 in the clamping passage 27 serves to avoid slippage of the handle bar 50. The bridge plate 29 between the upper and lower arch plates 24, 26 serves to abut against a lower side of the adjoining beam of the handle bar 50 so as to stabilize the basket 40*a* and avoid swinging thereof.

It should be noted that the above description and accompanying drawings are only used to illustrate one embodiment of the present invention, not intended to limit the scope thereof. Any modification of the embodiment should fall within the scope of the present invention.

What is claimed is:

1. A quick-release locking device for locking an article basket on a bicycle handle bar, comprising a fastener body and a main body, wherein:

the fastener body includes a frame body and a plate body having the same shape as that of the frame body, the frame body being attached to the plate body, each corner of the frame body and the plate body being formed with a thread hole, the plate body being formed with symmetrical insertion slots, a fixing slot being formed at a center of the plate body between the two insertion slots;

a front end of the main body is disposed with two latch arms each defining a recess on inner side corresponding to the insertion slot of the plate body, a wall between the latch arms being disposed with a resilient plate having a slope engaging section, two ends of rear side of the resilient plate being respectively disposed with two abutting plates each having a projection extending into a push button hole, two sides of a bottom of the push button hole being disposed with posts for fitting springs thereon, the center of the bottom of the push button hole being also disposed with a post, after the springs are fitted on the lateral posts, a push button being resiliently inserted with the posts and latched in the push button hole, a center of the push button being formed with a lock core hole in which a lock core with a lock hole is movably inserted, the bottom of the push button being disposed with a slope engaging block near the resilient plate of the fastener body, a rear end of the main body being disposed with a clamping passage in which the bicycle handle bar is adapted to be clamped; and when pressing down the push button, the slope engaging block of the push button abuts against the abutting plates of the resilient plate of the main body to backward retract the resilient plate, whereby the slope engaging section is disengaged from the fixing slot of the fastener body.

2. A quick-release locking device as claimed in claim 1, wherein an upper edge of the fixing slot of the fastener body is disposed with a mark arrow.

3. A quick-release locking device as claimed in claim 1, wherein a wall of the main body is formed with a U-shaped sink surrounding the resilient plate, whereby the resilient plate downward extends from a top wall of the main body.

4. A quick-release locking device as claimed in claim 1, wherein two sides of the bottom of the push button are disposed with resilient slope latch sections for resiliently latching in the push button hole.

5. A quick-release locking device as claimed in claim 1, wherein a key can be fitted into the lock core for unlocking.

6. A quick-release locking device as claimed in claim 1, wherein two sides of a rear end of the main body are disposed with upper and lower arch plates, a rear end of each upper arch plate being formed with a vertical bolt hole, a bottom of front end of the upper arch plate being formed with a transverse pin hole for an insertion pin to fit thereinto so as to connect with the lower arch plate formed with a pin hole at rear end, the rear end of the lower arch plate being formed with a vertical bolt hole, a slipproof block being disposed on a concave formed on the lower arch plate, whereby the upper and lower arch plates define therebetween a clamping passage, a bolt being passed through the thread holes of the upper and lower arch plates so as to lock two sides of the upper and lower arch plates to form the clamping passage for clamping and fixing the bicycle handle bar, a bridge plate being connected between two lower arch plates.

7. A quick-release locking device as claimed in claim 1, wherein the fastener body is adapted to be attached to an article bag or an article basket.

* * * * *